United States Patent [19]

Murakami

[11] Patent Number: 5,912,747
[45] Date of Patent: Jun. 15, 1999

[54] SCANNING DEVICE WHICH SCANS A DOCUMENT IN A REVERSE MOVING ACTION

[75] Inventor: Hiroshi Murakami, Toyokawa, Japan

[73] Assignee: Minolta Co., Ltd., Osaka, Japan

[21] Appl. No.: 08/358,734

[22] Filed: Dec. 19, 1994

[30] Foreign Application Priority Data

Jan. 19, 1994 [JP] Japan .................................. 6-003838

[51] Int. Cl.⁶ .................................................. H04N 1/04
[52] U.S. Cl. ......................... 358/497; 358/474; 358/488; 355/235
[58] Field of Search .................................. 358/497, 498, 358/474, 448, 449, 451, 401, 488; 355/308, 311, 313, 235

[56] References Cited

U.S. PATENT DOCUMENTS 4,752,891  6/1988  Van Deale et al. ..................... 358/474
4,922,350  5/1990  Rombola et al. ....................... 358/488
5,192,975  3/1993  Ide et al. ................................. 355/235

FOREIGN PATENT DOCUMENTS 54-73026   6/1979   Japan .
2-503738  11/1990   Japan .

Primary Examiner—Thomas D. Lee
Attorney, Agent, or Firm—Sidley & Austin

[57] ABSTRACT

A controller moves a scanner at least to the farthest end portion of an original document placed on a platen in a forward moving action, and the original document is scanned in a reverse moving action of the scanner. In the case when an original document is fed by an original document feed device onto the platen, the scanner is started for a forward movement before the original document feeding operation is completed.

18 Claims, 13 Drawing Sheets

Fig. 10
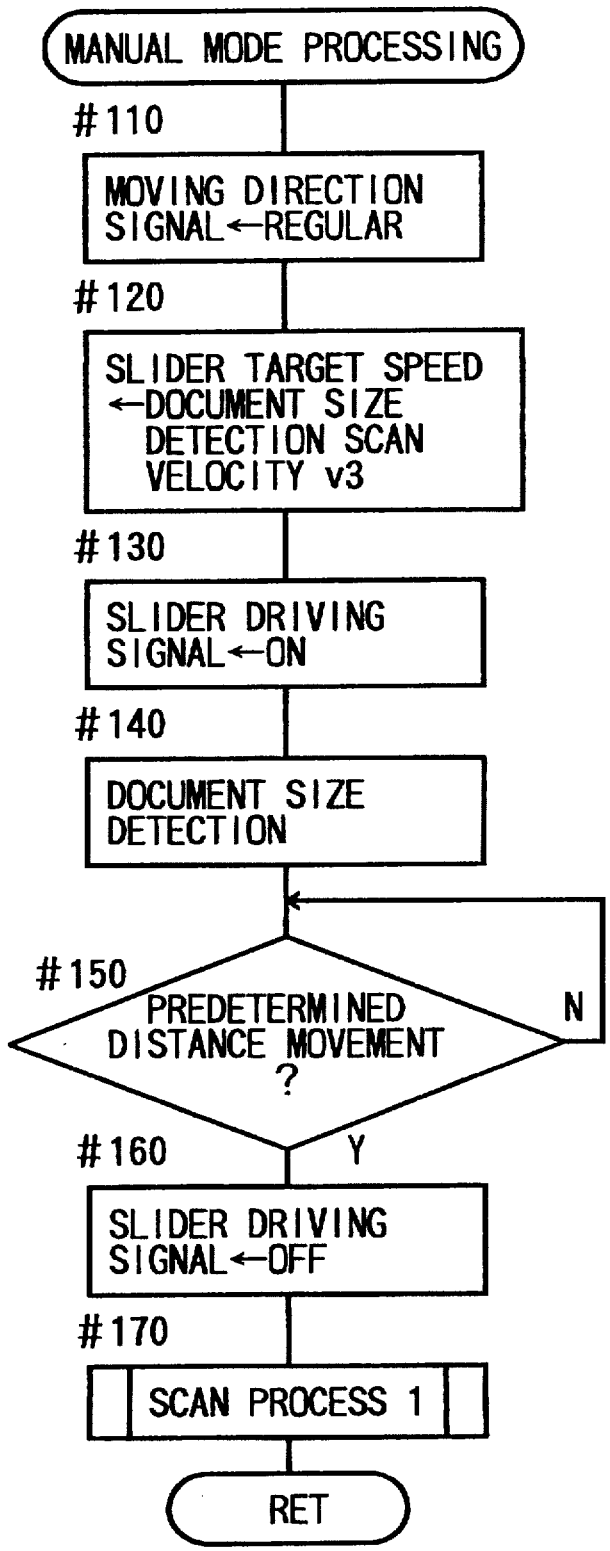
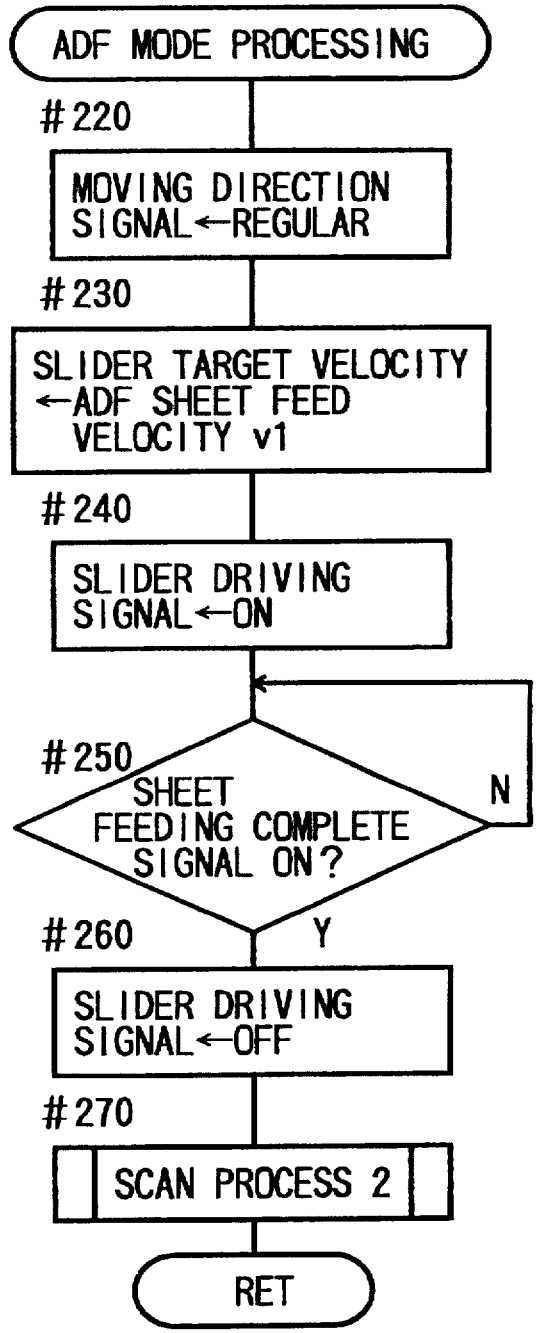

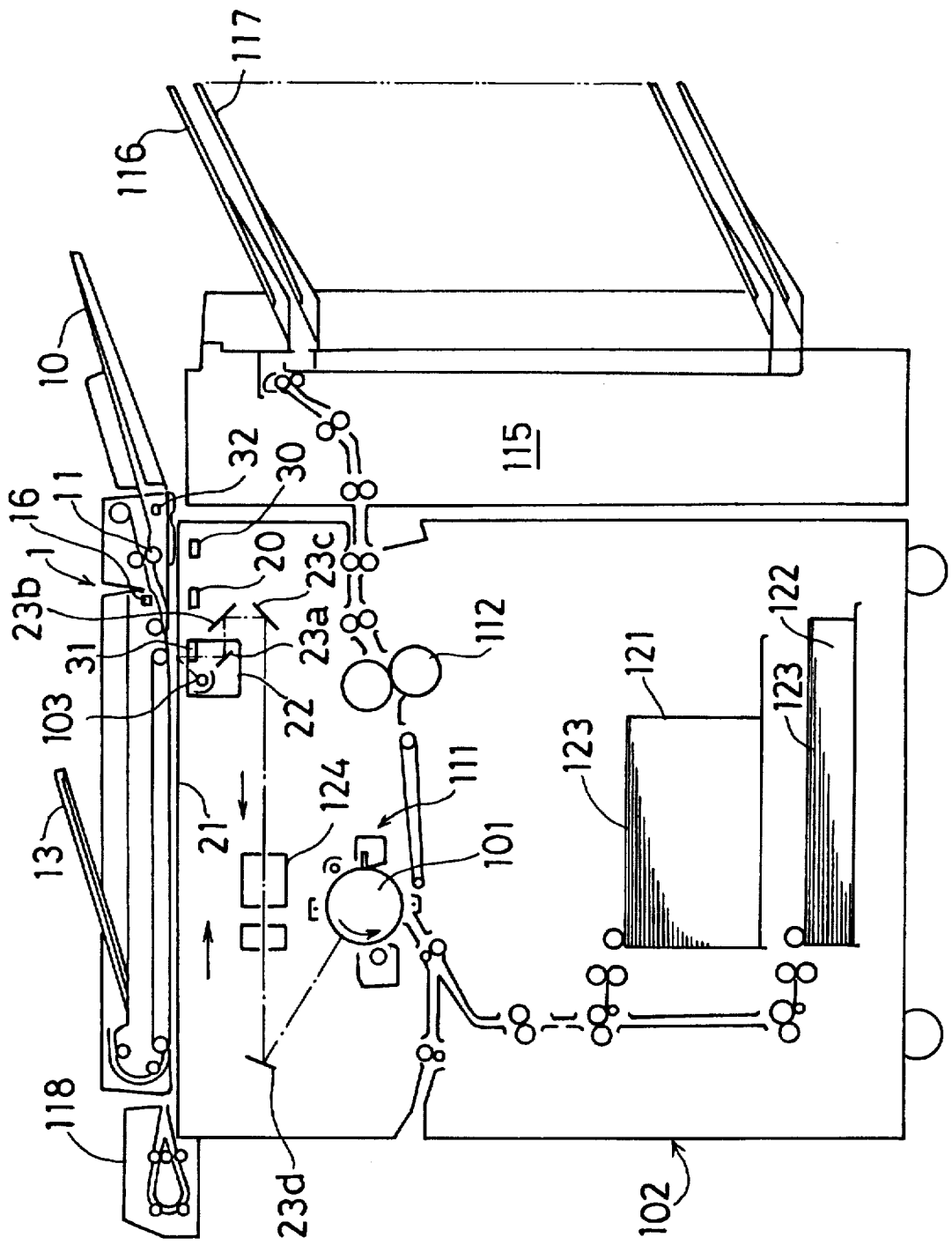

SCANNING DEVICE WHICH SCANS A DOCUMENT IN A REVERSE MOVING ACTION

BACKGROUND OF THE INVENTION

1. Technical Field of the Invention

The present invention relates to a scanning device for reading an image, and more particularly, to a scanning device which adopts a reverse scanning control method wherein a scanner for reading an image is arranged to move to a farthest end portion of an original document in a forward moving action, and to scan the original document in a reverse moving action.

2. Description of Related Art

As a method for detecting a size of an original document placed on a predetermined position of an original document table, Japanese Published Unexamined Patent Application No.186923/1989 discloses a method for conducting a preliminary scanning operation for detecting a size of the original document before performing a regular scanning operation for reading an image of the original document.

In the case when a size of the original document is detected by conducting a preliminary scanning operation prior to a regular scanning of the original document in such a way as described above, information on the original document can be accurately grasped preliminarily. However, such two scanning operations conducted for one image reading process results in a loss in speed of copying.

In order to solve the problem, a Japanese official gazette TOKUHYO HEI 2-503738 discloses a scanning apparatus which adopts the above-mentioned reverse scanning control method. In the apparatus, an original scanning means is arranged to detect a size of an original document in a forward direction scan wherein said means is moved to a farthest end portion of the original document, and in a reverse direction scan, an image of the original document is read so that one scanning operation satisfies one image reading process, thereby increasing speed of the copying operation.

In recent years, an electrophotographic copying machine which is provided with an original document feed apparatus for automatically feeding an original document to a predetermined position on an original document table has been used widely in order to increase copying speed when a large quantity of original documents are copied. Such an apparatus is also applied to an image reading device for collecting and processing a large quantity of original documents.

In a device which is provided with said document feed apparatus, it is arranged to detect a size of an original document being transported by the original document feed apparatus. It is, therefore, not necessary to adopt the preliminary scanning method or the reverse scanning method mentioned above when the original document is automatically fed to a predetermined position on an original document table provided in a main body of the image reading device. If such scanning methods are indiscriminately adopted even when the original document feed apparatus is used, a scanning operation has to be wastefully performed in the case of the preliminary scanning method, and in the case of the reverse scanning control method, a time to start an image reading operation is meaninglessly delayed since a reverse action for a reverse scanning is performed for an original document which has been automatically fed.

It may be considered to adopt a reverse scanning control method in the case when an original document is manually set on a predetermined position of an original document table without using the original feed apparatus since the original document is specific in size and form such as a book which is not adaptable to the original feed apparatus or when original documents to be copied are small in number. The ordinary scanning method can be alternating adopted when original documents are fed automatically by the original feed apparatus.

However, there still remains a problem that it necessitates a process to temporarily store an image information which has been read in order to decide whether the original document feed apparatus is required or not which eventually causes an increase in manufacturing cost, and there occurs defect in soft control. Moreover, a construction of the device becomes complicated since it is necessary to move a scanner in reciprocating motion for reading an image of an original document in forward and reverse directions, and high accuracy is required to provide a proper tension to a driving wire for the reciprocating motion to further increase manufacturing cost.

SUMMARY OF THE INVENTION

An object of the present invention is to provide a scanning device which adopts a reverse scanning control method wherein a copying operation is not delayed even when an original feed apparatus is applied.

Another object of the present invention is to provide a copying machine which is capable of performing a copying operation by utilizing the above-mentioned scanning device.

These and other objects and features of the present invention will become more apparent from the following descriptions taken in conjunction with the accompanying drawings which illustrate specific embodiments of the invention.

BRIEF DESCRIPTION OF THE DRAWINGS

FIG. 10 is a flowchart showing a manual mode and an ADF mode processing of FIG. 9.

FIG. 13 is a basic structural view showing a copying machine which is provided with an original document feed apparatus to which a second embodiment of the present invention is applied.

DESCRIPTION OF THE PREFERRED EMBODIMENTS

Description will now be made hereinafter on some of embodiments of the present invention referring to the accompanying drawings.

FIGS. 1 through 9 show a first embodiment of the present invention wherein an image reading device 2 which is provided with an original document feed apparatus 1 on its upper portion as an original document feed means is illustrated.

Figure 1:
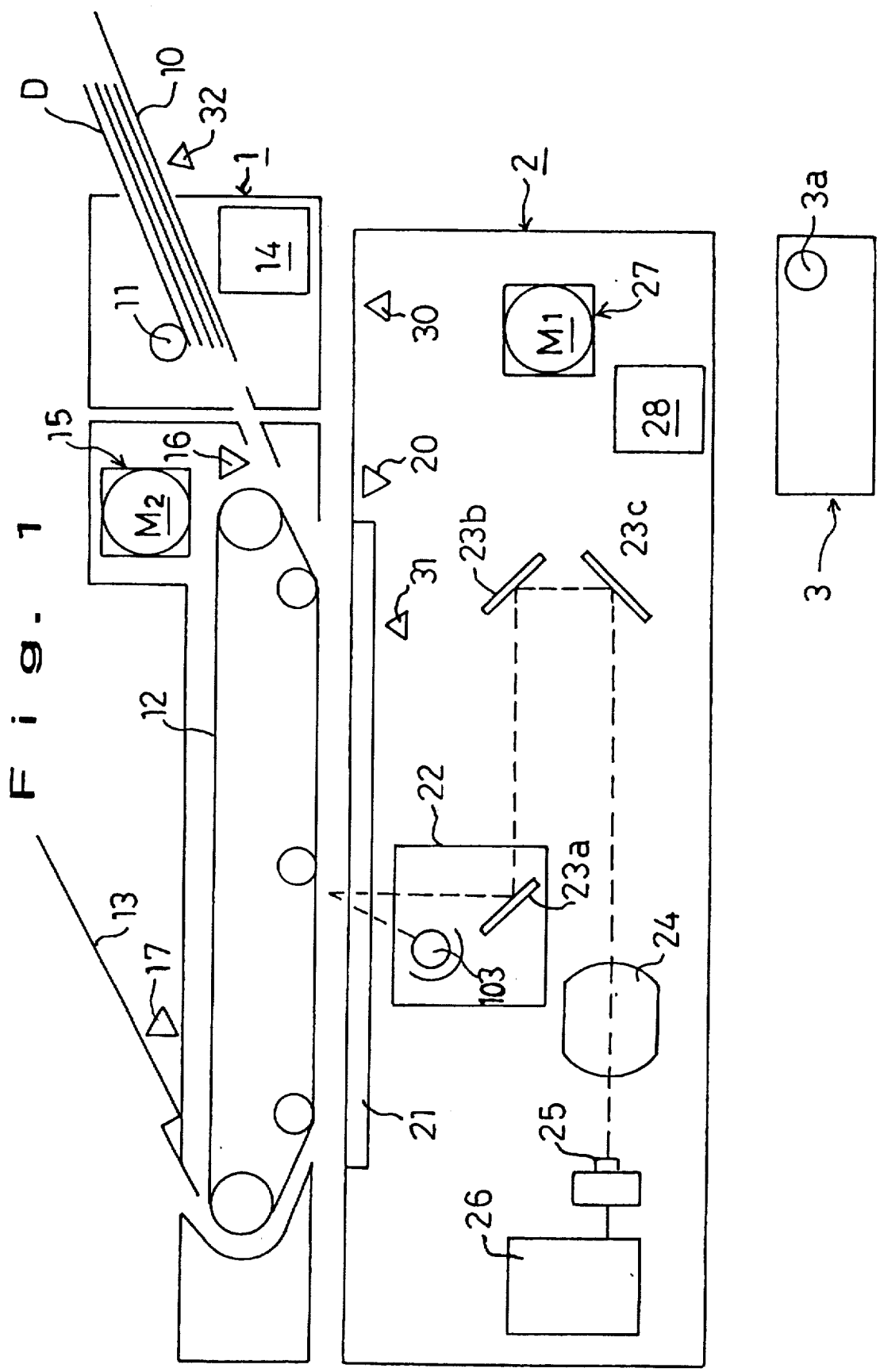
FIG. 1 is a basic structural view showing an image reading device which is provided with an original document feed apparatus to which a first embodiment of the prevent invention is applied.

As shown in FIG. 1, the image reading device 2 is provided with a platen glass 21 on its upper surface, and beneath the platen glass 21, there is provided a slider 22 which is capable of moving in reciprocating motion in a predetermined direction for reading an image of an original document D placed on the platen glass 21 as a scanning section of a scanner.

The slider 22 is provided with an illuminating lamp 103 and a first mirror 23a to guide a reflected light from the original document D to a projection lens 24 through the first mirror 23a, a second and a third mirrors 23b, 23c, and an image of the original document D is projected on a CCD sensor 25 as an image sensor by the projection lens 24 to electrically read the image.

Figure 2:
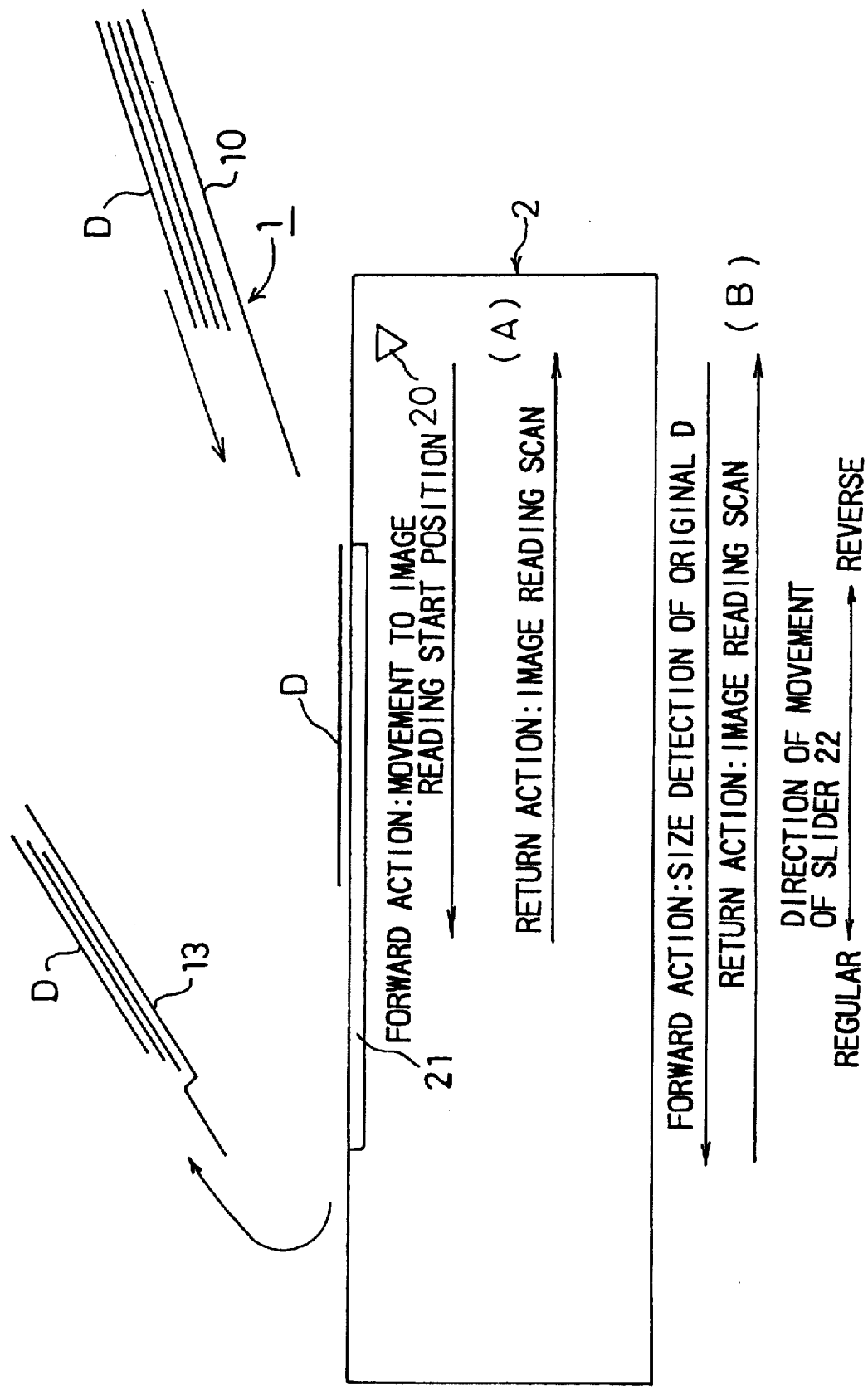
FIG. 2 is an explanatory view showing a fundamental action of the image reading device shown in FIG. 1.

In the present embodiment, the slider 22 is movably supported in the main body of the image reading device 2 to move in reciprocating motion in two directions shown by of arrows (A) and (B) which are different in length as shown in FIG. 2. The slider 22 is driven by a slider driving section 27 represented by a slider motor M1 shown in FIG. 1 to optically scan the original document D placed on the platen glass 21 shown in FIG. 2. It is arranged to conduct an image reading operation over the entire original document D.

A direction in which the original document D is fed onto the platen glass 21 coincides with a direction wherein said original document is discharged. A length of the arrow (A) is shown as an example to show a range of movement of the slider 22 under an ADF mode wherein the original document D is automatically fed by the original feed apparatus 1, and a length of the arrow (B) is shown as an example to show a range of movement of the slider 22 under a manual mode wherein the original document D is set manually.

Such a difference in the range of movement between the ADF mode and the manual mode corresponds to a difference in a minimum range of movement required for each one of the modes. In the ADF mode, a size of the original document D is detected during transport of the original document D, and therefore, it is only necessary to read an image of the original document corresponding to a range of the size detected by moving the slider 22 at least to the farthest end portion of the original document D. On the other hand, when the original document is set manually, a range of movement for detecting a maximum size of the original document D is required for detecting its size.

The range of movement of the slider 22 shown by the arrow (A) under the ADF mode is set at a minimum limit required to match to a size of the original document D so that a delay caused by any wasteful movement of the slider 22 is prevented for starting an image reading operation. However, it is preferable to let the slider 22 move forward a little further than the farthest end portion of the original document D since it is liable to induce a deficiency in an image reading operation due to an error in movement and a lag in operation timing of the slider 22 if the range of movement is set to strictly match to a size of the original document D.

In the present embodiment, the reverse scanning control method is adopted irrespective of the manual mode or the ADF mode wherein an image reading operation is conducted when the slider 22 is moved in a reverse direction. Therefore, only when the original document D is set under the manual mode, the slider 22 detects a size of the original document D during forward movement, and under the ADF mode, the slider 22 is controlled to start an action of forward movement before an original document is fed by the original feed apparatus 1.

With such an arrangement, the slider 22 is moved at least to the farthest end portion of the original document D in an action of forward movement whether the original feed apparatus 1 is used or not, and in an action of reverse movement, the original document D is scanned to read an image so that a complicated process is avoided in constructing and controlling the device. When an original document D is manually set on a predetermined position of the platen glass 21, a size of the original document D is detected during forward movement of the slider 22. When an original document D is automatically fed by the original document feed apparatus 1, the slider 22 is operated to start an action of forward movement before completion of feeding the original document D so that a time point for starting an image reading operation can be quickened to speed up the copying operation, and an image reading operation matching to a size can be accomplished based on the size information which is detected when the original document D is fed.

Each one of the second and third mirrors 23b, 23c are moved simultaneously with a movement of the slider 22 at a half velocity of the slider 22, and it is arranged not to change an optical path length of a projection optical path by the projection lens 24 even if the slider 22 is moved.

It may be arranged to change a projection magnification of an image of an original document D into the CCD 25 by an independent movement of the projection lens 24 or by accompanying the movement of said mirrors. To the CCD 25, an image processing section 26 is connected as shown in FIG. 1, and in the image reading device 2, there is provided an image reading control section 28 as a control means for performing an image reading operation.

As illustrated in FIG. 1, the original document feed apparatus 1 is provided with an original document feed table 10 for stacking a multiplicity of original documents D, and the original documents D stacked on the original document table 10 is forwarded one by one by a known sheet feeding roller mechanism which is representatively illustrated by a sheet feed roller 11. Each of the original documents D forwarded one by one is further transported onto the platen glass 21 by a transport belt 12 positioned above the platen glass 21, and is placed at a predetermined position on the platen glass 21 for an image reading operation. After the image of the original document D has been read, the original document is discharged onto an original document discharge table 13. An original document feed driving section 15 and an original document feed control section 14 shown in FIG. 1 are provided for performing said operations. The original document feed driving section 15 is also representatively illustrated by a sheet feed motor M2.

An operation panel 3 provided with a start key 3a shown in FIG. 1 is provided on the main body of the image reading device 2 in common to the original document feed apparatus 1 and the image reading device 2 for starting an image reading operation.

In the original document feed apparatus 1, there are provided a sheet feeding complete sensor 16 for detecting that an original document D had been forwarded to a predetermined position on the platen glass 21, a sheet discharge complete sensor 17 for detecting that the an original document D after image reading operation had been discharged onto a predetermined position on the original document discharge table 13, and an original document detecting sensor 32 for detecting whether or not an original document D is present on the original document feed table 10, respectively. The sheet feeding complete detection sensor 16 provides the original document feed control section 14 with time information required for an original document D passing through for detecting its size.

In the image reading device 2, there are provided a standard position sensor 20 for detecting a standard position as a home position of the slider 22 which is set adjacent to the platen glass 21 and upstream in a direction an original document D on the platen glass is fed, a sensor 30 for detecting whether or not the original document feed apparatus 1 covers the platen glass 21, and an original document sensor 31 for detecting whether or not an original document D is present on the platen glass 21, respectively.

Figure 3:
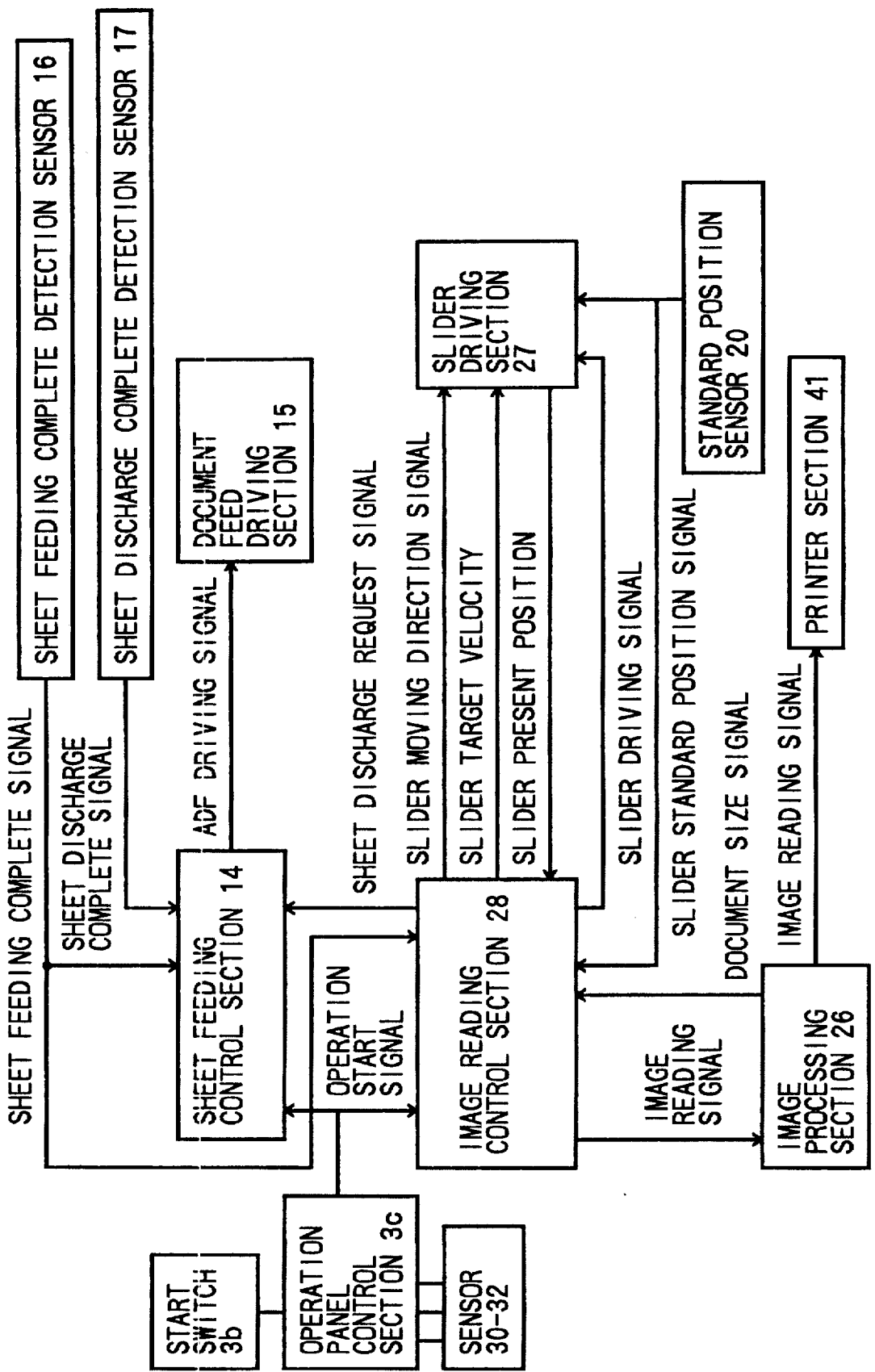
FIG. 3 is a block diagram showing an input and output relation in the image reading device shown in FIG. 1 including a printer section.

When a size of an original document is set on the operation panel 3, the operation panel 3 transmits the size to the image reading control section 28 through an operation panel control section 3c shown in FIG. 3, and turning on a start switch 3b by pressing a start key 3a, it is further transmitted to the original document feed apparatus 1 and image reading device 2 through the operation panel control section 3c as an action start signal.

Upon receipt of the action start signal from the start key 3a of the operation panel 3, the original document feed control section 14 in the original document feed apparatus 1 transmits a driving signal of the original document feed apparatus 1 to the original document feed driving section 15 to perform an automatic sheet feeding and forwarding of an original document D until the sheet feeding complete sensor 16 detects completion of sheet feeding.

Then, the original document feed control section 14, upon receipt of a signal from the image reading control section 28 requesting a sheet discharge, transmits an action start signal to the original document feed driving section 15 to perform a sheet discharge operation until the sheet discharge complete sensor 17 detects that the sheet discharging operation had been completed.

The image reading control section 28 of the image reading device 2 is arranged to totally control the apparatus by input and output relation shown by a block diagram in FIG. 3. More particularly, when an action start signal is received from the start key 3a of the operation panel 3, it controls to perform a series of operations such as an original document feed action, movement of the slider 22 to a scanning start position, a scanning operation and an original document discharging operation.

Upon receipt of a slider driving signal from the image reading control section 28, the slider driving section 27 drives the slider 22 in a direction and velocity specified by the image reading control section 28.

The image processing section 26 converts an electrical signal from the CCD 25 into a digital signal when an image reading signal from the image reading control section 28 is being inputted, and after various image processing have been completed, the digital signal is transmitted to a printer section 41 shown in FIG. 3 or to an output-oriented apparatus such as an unillustrated memory device. The output-oriented apparatus may be arranged integrally with the image reading device 2, or it may be provided as an external apparatus. When combined with the printer section 41, a digital copying machine may be constructed. An analogue copying machine may also be constructed as shown in FIG. 13 wherein a scanning light emitted from an original document by a scanner as a second embodiment of the present invention is led directly onto a photoconductor for an image forming operation. Further detailed description will be made later.

Figure 4:
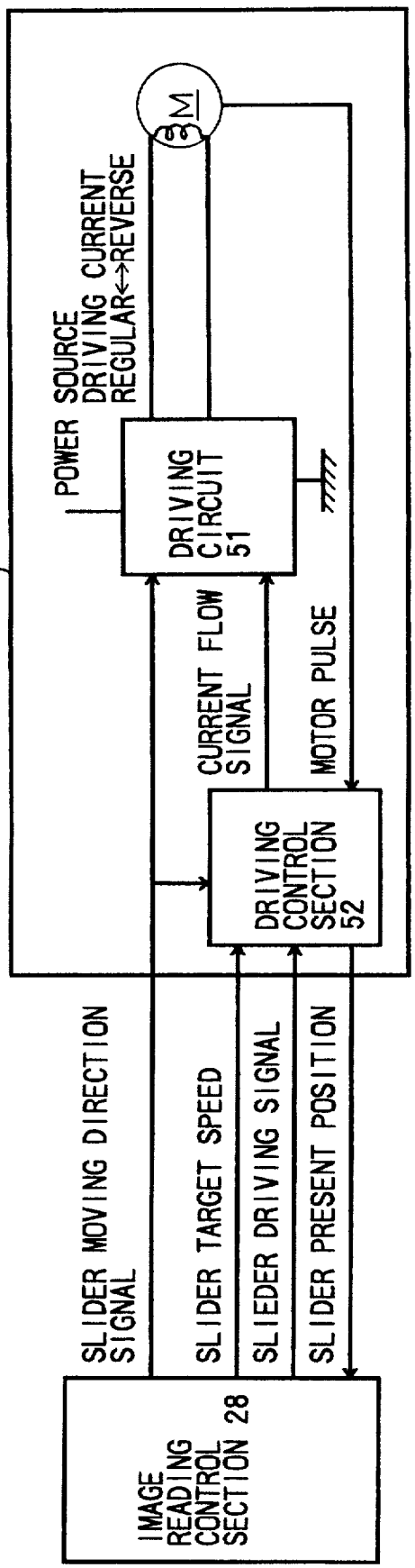
FIG. 4 is a concrete circuit diagram showing a slider driving section of a scanning device which is provided with the image reading device shown in FIG. 1.

The slider driving section 27 is constructed in a manner as illustrated concretely in FIG. 4. The slider driving section 27 reciprocate signals between the image reading control section 28, and a driving circuit 51 of a slider motor M1 receives a slider moving direction signal from the image reading control section along with a driving control section 52. Upon receipt of a current flow signal which is output when the driving control section 52 has received a driving signal from the image reading control section 28, the driving circuit applies electricity to the slider motor M1 as a driving power source. A driving current is applied in a regular or reverse direction according to the moving direction signal of the slider 22.

The slider motor M1 is rotated in a regular or reverse direction by a current flow direction of driving current to drive the slider 22 in a regular or reverse direction. The slider motor M1 is provided with a rotary encoder therein, and outputs a motor pulse to the driving control section 52 in proportion to the number of rotations.

The driving control section 52 also detects a velocity of movement of the slider 22 from a pulse duration of the motor pulse, and controls to turn on and off an electricity applying signal which is given to the driving circuit 51 in order to cause a velocity of scanning to be a target velocity. The driving control section 52 further performs to detect a position where the slider 22 is presently positioned by counting a motor pulse. In the counting process, when a direction of movement of the slider 22 is regular, the number is counted up. On the contrary, if a direction of movement of the slider 22 is reverse, the number is counted down. Then, a detected information related to the present position of the slider 22 is transmitted to the image reading control section 28.

With the constructional arrangement described above, the image reading control section 28 is able to control a movement of the slider 22 by only turning on a driving signal of the slider 22 after a movement direction signal and a target velocity are set since velocity control and position detection of the slider 22 are conducted by the driving control section 52.

The original document feed control section 14 provided for controlling the original document feed motor M2 of the original document feed apparatus 1 is similarly constructed, however, the original document feed driving section 15 is constructed excluding four signals, i.e., the moving direction signal, the target velocity signal, the present position signal and the motor pulse signal shown in FIG. 4, since a driving direction and a driving velocity in the original document feed apparatus 1 are set at a fixed value, and a position of an original document D is detected by a sensor.

Figure 5:
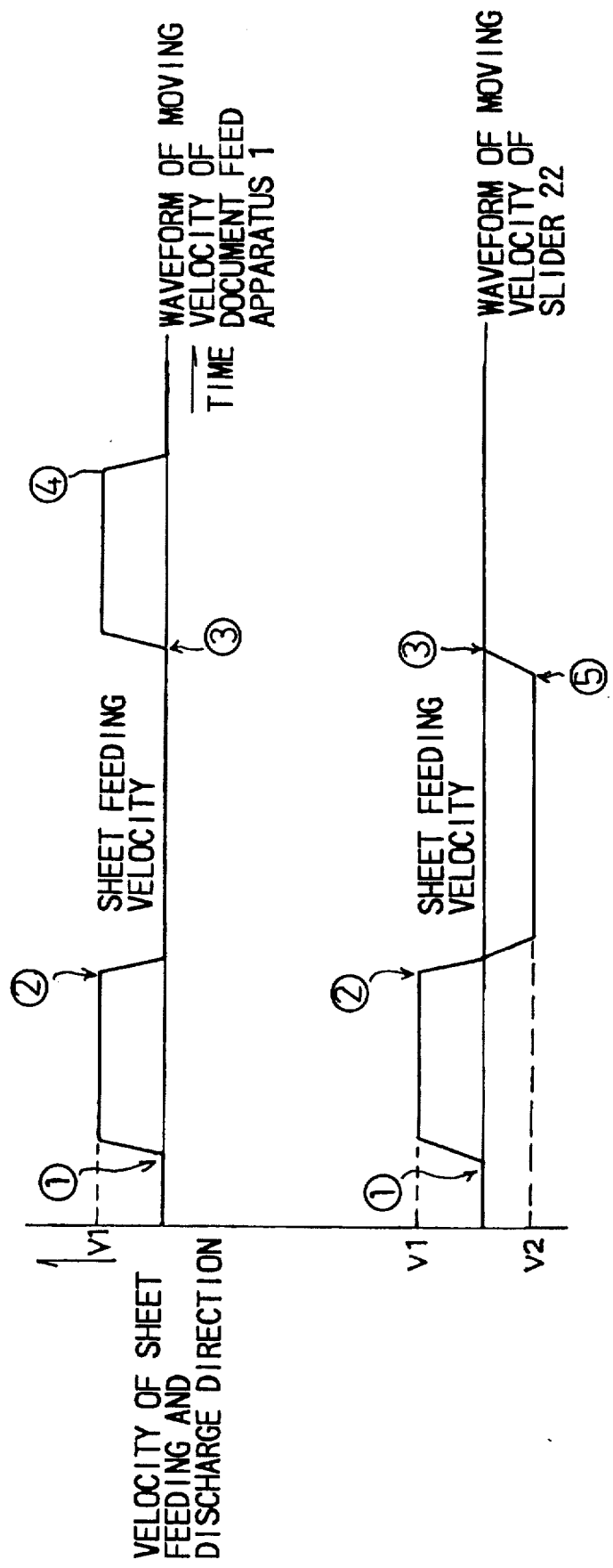
FIG. 5 is a waveform chart showing a velocity of movement of an original document feed apparatus and slider under an ADF mode of the image reading device shown in FIG. 1.

In FIG. 5, there are shown waveforms of moving velocity of the original document feed apparatus 1 and of the slider 22 under the ADF mode wherein the original document feed apparatus 1 is utilized. The slider 22 performs a forward moving action as far as the end portion of an original document D at a velocity of v1 which is the same velocity v1 the original document feed apparatus 1 feeds an original document whereby a wasteful movement of the slider 22 up to the end portion of the platen glass 21 is eliminated. An image reading operation can thus be performed at a slower velocity v2 than that of the forward movement from this position.

The numerals (1) through (5) shown in FIG. 5 show timings of various input and output processing, wherein (1) shows an action start signal, (2) a sheet feed complete signal, (3) a sheet discharge request signal, (4) a sheet discharge complete signal, and (5) a standard position signal of the slider 22, respectively.

Figure 6:
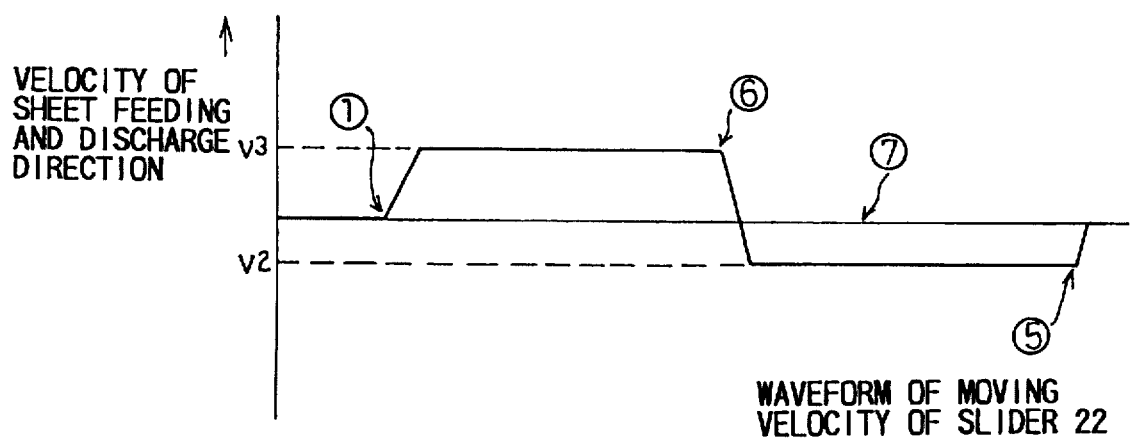
FIG. 6 is a waveform chart showing a velocity of movement of a slider under a manual mode of the image reading device shown in FIG. 1.

In FIG. 6, there is illustrated a waveform of moving velocity of the slider 22 when an original document D is manually set under the manual mode wherein the slider 22 performs a forward movement as far as the end portion of the platen glass 21 for detecting a size of the original document D at a velocity of v3. Then, an image reading operation is performed at a slower velocity v2 than that of the forward movement, and based on a size of the original document detected at the forward moving action, the slider 22 starts to perform an actual image reading operation at the position (7). The numeral (6) shown in FIG. 6 is a predetermined distance moving signal, and (7) is an on-signal for an image reading operation.

The reason why the image reading velocity v2 is set slower than the velocities v1 and v3 is that an image can be read in high image quality. The velocity v3 is applied only when a size of the original document D is detected. The velocities v1 and v3 may be set in a different value, or in the same value.

Description will now be made hereinafter on a principal action control referring to FIGS. 7 through 12.

Figure 7:
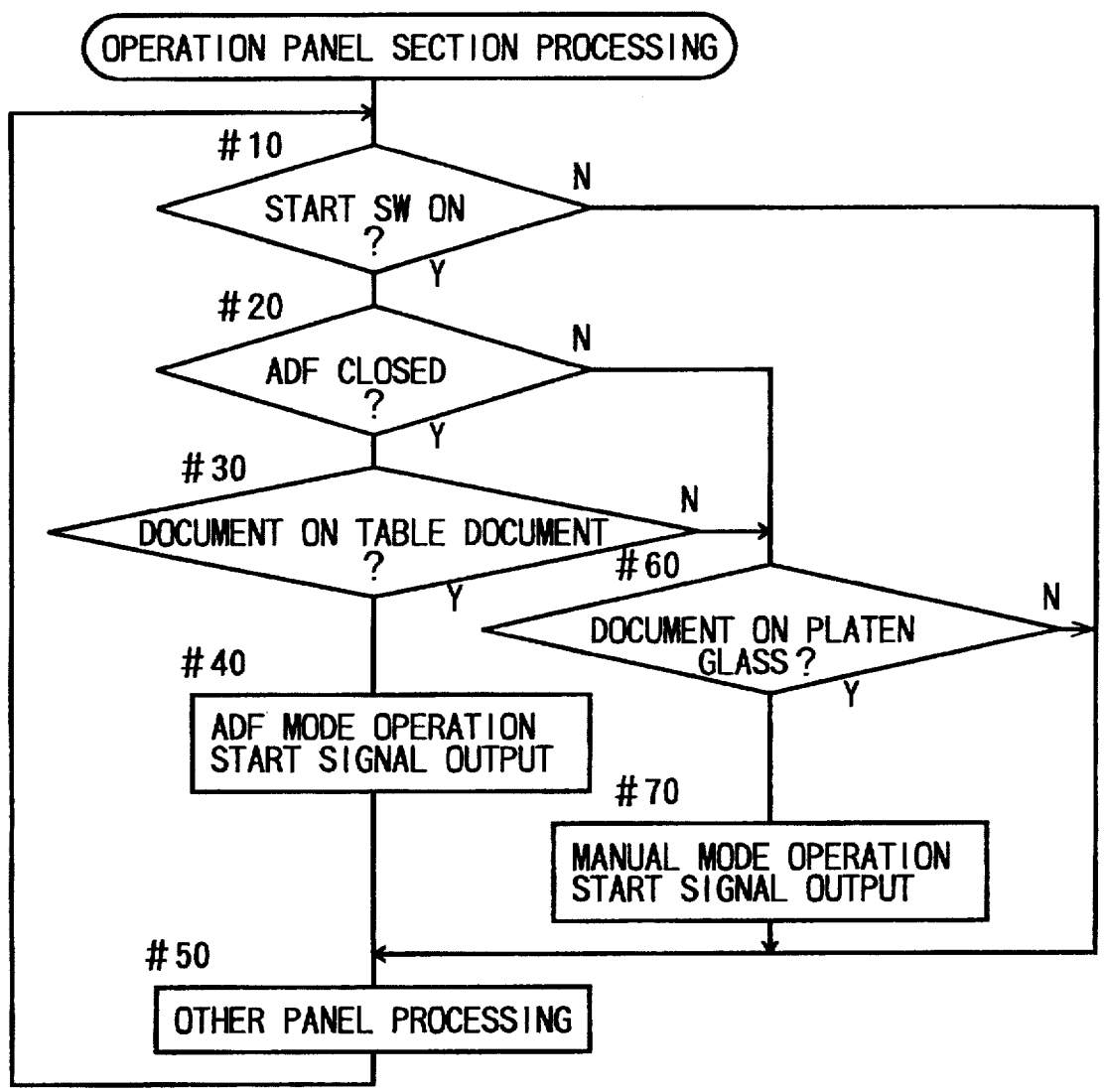
FIG. 7 is a flowchart showing a processing in an operation panel section of the image reading device shown in FIG. 1.

FIG. 7 is a flowchart showing operations which are processed in the operation panel control section. At step #10, when the start switch 3b is put under on-edge, i.e., a change from off to on, by pressing the start key 3a, a judgment is made at step #20 whether the original document feed apparatus 1 is opened or closed. In the case when the original document feed apparatus 1 is closed, a confirmation is made at step #30 that an original document D is on the original document feed table 10, and at step #40, an operation start signal under the ADF mode is output.

At step #20, when the original document feed apparatus 1 is opened or even when the original document feed apparatus 1 is closed at step #20, if there is no original document D placed on the platen glass 21 and the original document feed apparatus 1 is not used at step #30, after confirming that an original document D is placed on the platen glass 21 at step #60, an operation start signal under manual mode is output at step #70. At step #50, other operations are processed related to the operation panel 3.

Figure 8:
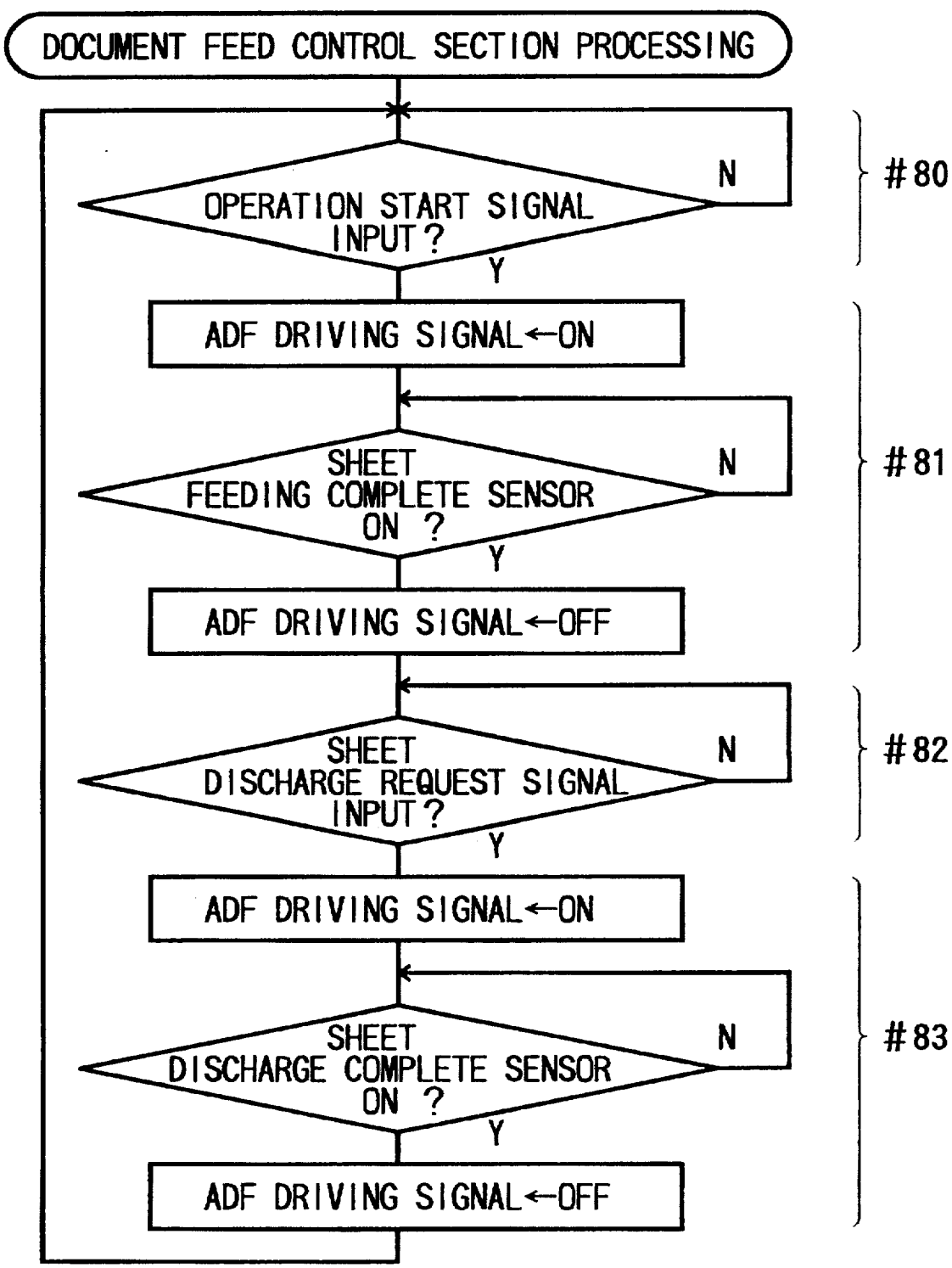
FIG. 8 is a flowchart showing a processing in an original document feed control section.

FIG. 8 is a flowchart showing operations which are processed in the original document feed control section of the original document feed apparatus 1. At step #80, when an operation start signal is inputted, a driving signal for the original document feed apparatus 1 is turned on at step #81 to automatically feed an original document D placed on the original feed table 10 to a predetermined position on the platen glass 21, and upon confirming the completion of feeding action by the turning on of the sheet feeding complete sensor 16, the driving signal of the original document feed apparatus 1 is turned off to finish the feeding operation.

Then, at step #82, when a sheet discharge request signal is inputted from the image reading control section 28 of the image reading device 2, the driving signal of the original document feed apparatus 1 is turned on again at step #83 to automatically discharge the original document D which is placed on the platen glass 21 onto the original document discharge table 13, and upon confirming completion of the document discharging operation by the turning on of the document discharge complete sensor 17, the driving signal of the original document feed apparatus 1 is turned off to finish the document discharging operation.

Figure 9:
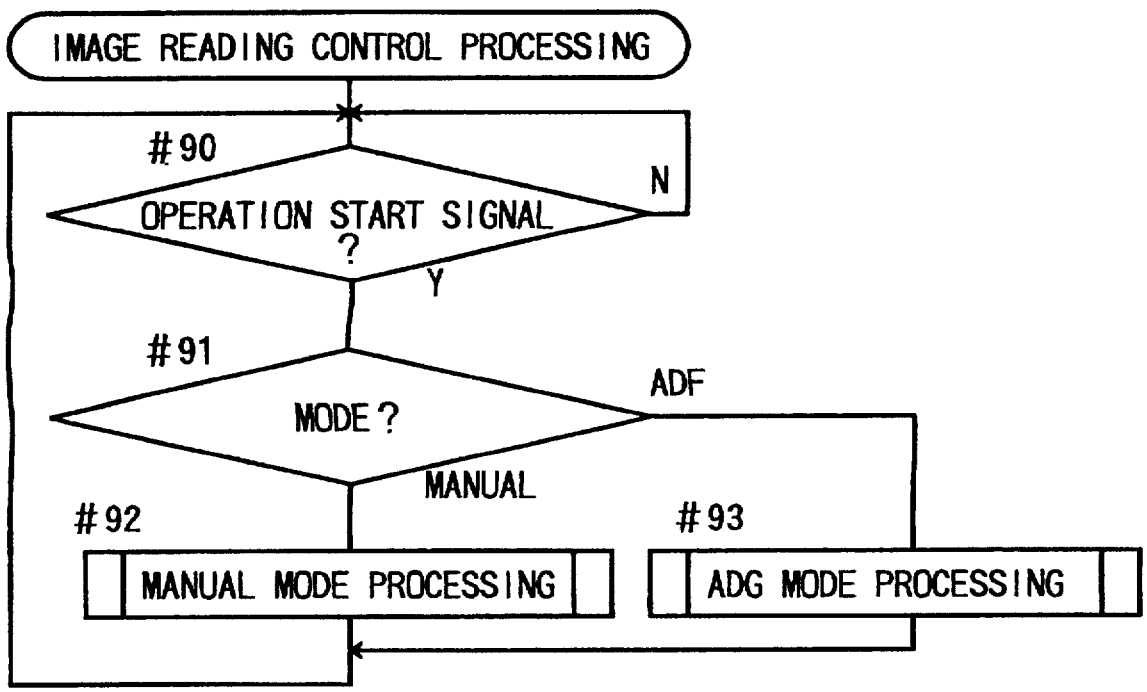
FIG. 9 is a flowchart showing a processing in an image reading control section.

FIG. 9 is a flowchart showing an operation control of the image reading control section 28. When an operation start signal is inputted at step #90, a judgment is made whether an operation mode is the ADF mode or the manual mode at step #91, and according to a respective mode, either a manual mode processing at step #92 or an ADF mode processing at step #93 is executed.

FIG. 10 (a) is a flowchart showing a manual mode processing. At step #110, a moving direction of the slider 22 is set for "regular", and at step #120, a target velocity is set at v3 for detecting a size of the original document D. Thereafter, at step #130, the driving signal of the slider 22 is output to start an actual driving under the conditions which have been set as described above, and a size of the original document D is detected at step #140.

At step #150, when it is detected that the slider 22 has moved a predetermined distance, i.e. as far as the end portion of the platen glass 21, a moving signal of the slider 22 is turned off at step #160 to stop the slider 22, and at the same time, a scanning process 1 is performed at step #170 to perform an image reading operation under the manual mode.

FIG. 10 (b) is a flowchart showing an ADF mode processing. At step #220, a moving direction of the slider 22 is set for "regular", and a target velocity is set at a document feed velocity of the original document feed apparatus 1 at step #230. Then, at step #240, the driving signal of the slider 22 is turned on to actually move the slider 22 under the conditions which have been set as described above.

Then, at step #250, when a sheet feeding completion is confirmed by turning on of the sheet feeding complete sensor 16, the driving signal of the slider 22 is turned off at step #260 to stop the slider 22, and at the same time, a scan process 2 is performed at step #270 to conduct an image reading operation under the ADF mode.

Figure 11:
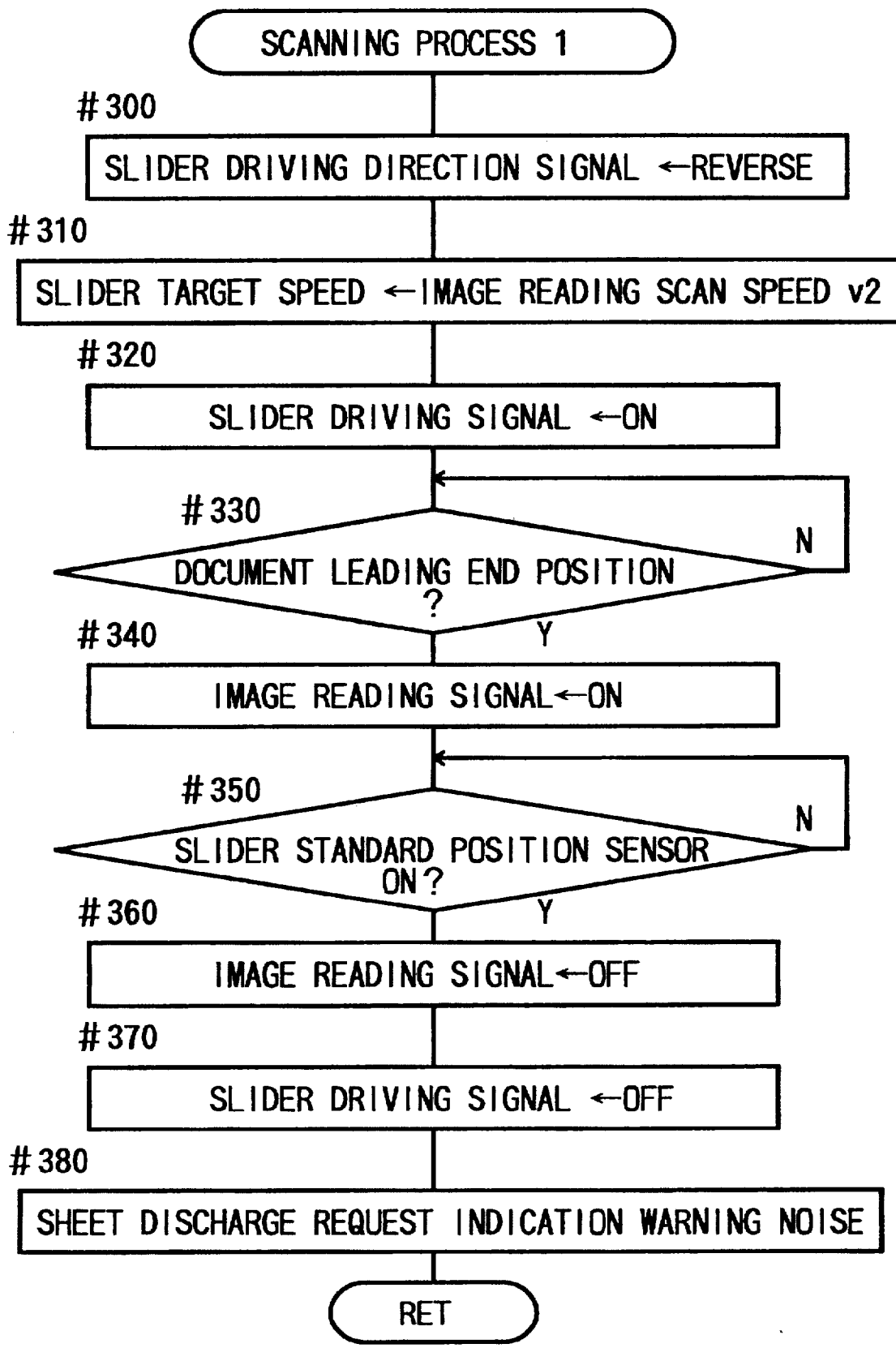
FIG. 11 is a flowchart showing a scanning process 1 of FIG. 10(a).

FIG. 11 is a flowchart showing a scanning process 1. At step #300, a driving direction signal of the slider 22 is set for "reverse", and after setting a target velocity of the slider 22 to an image reading scan speed v2 at step #310, the driving signal of the slider 22 is turned on at step #320 to perform an actual movement of the slider 22 under the conditions which have been set as described above.

At the next step #330, when a position of the leading end of original D is detected, the image reading signal is turned on at step #340 to start an image reading operation. At step #350, when it is confirmed that the slider 22 has returned to its standard position by turning on of the standard position sensor 20, the image reading signal is turned off at step #360 to stop the image reading operation, and at the same time, the driving signal of the slider 22 is turned off at step #370 to stop the slider 22 at the standard position. At step #380, a warning noise is given, or in place of the warning noise, a sheet discharge request is indicated on the operation panel 3 to urge the operator for a proper operation.

Figure 12:
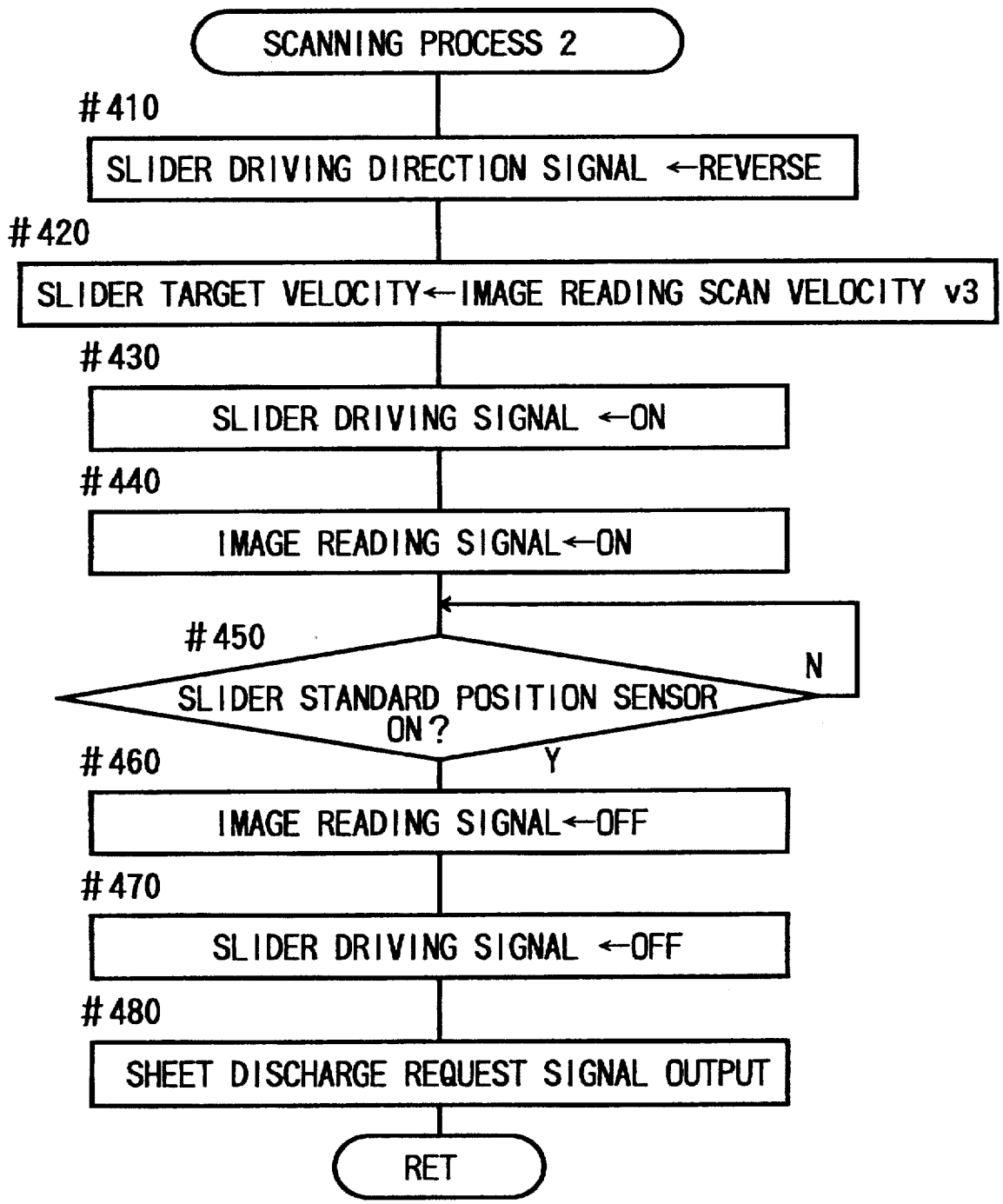
FIG. 12 is a flowchart showing a scanning process 2 of FIG. 10(b).

FIG. 12 is a flowchart showing a scanning process 2. At step #410, the driving signal of the slider 22 is set for "reverse", and at the same time, a target velocity of the slider 22 is set to an image reading scan velocity v2 at step #420. Then, the driving signal of the slider 22 is turned on at step #430 to actually move the slider 22 under the conditions which have been set as described above.

In the present embodiment, the slider 22 is positioned at an image reading start position matching to a size of an original document D so that an image reading operation of the original document D can be instantly performed by turning on the image reading signal at step #440. At step #450, when it is confirmed by the turning on of the standard position sensor 20 that the slider 22 has returned to the standard position, the image reading signal is turned off at step #460 to stop the image reading operation, and at the same time, the driving signal of the slider 22 is turned off to stop the slider 22 at the standard position. At step #480, a document discharge request signal is output to automatically discharge the original document D whose image had already been read.

As mentioned above, an original document feed velocity for feeding an original document by the original document feed apparatus 1 and a forward moving velocity of the slider 22 are set at the same value, and the forward movement of the slider 22 is controlled simultaneously with the original document feeding movement by the original document feed apparatus 1 so that the slider 22 can be started easily and at a proper timing before the original document feeding operation is completed.

However, the velocity of forward movement and the forward movement start timing of the slider 22 are not limited to the above-mentioned arrangement. It may also be arranged to start a moving action of the slider 22 to a scan starting position before an original document feeding operation by the original document feed apparatus 1 is completed.

For instance, a velocity of forward movement of the slider 22 may be set larger than a velocity of the automatic document feed which is conducted by the original document feed apparatus 1 in order to start the forward movement of the slider 22 after a predetermined time T from the automatic feed starting time of the original document D which is conducted by the original document feed apparatus 1. Conversely, it may also be arranged to set a velocity of original document feeding by the original document feed apparatus 1 larger than a velocity of forward movement of the slider 22 to start an original document feeding by the original document feed apparatus 1 after a predetermined time from the start of forward movement of the slider 22.

In such an arrangement as described above, depending on a size of the original document D which is fed, there occurs a difference in time between a time required for the original document feed apparatus 1 to complete a sheet feeding operation and the time required for the slider 22 to reach a position for starting a scanning operation. In this case, a timing for starting a reverse movement of the slider 22 or a timing for starting an image reading operation may be adjusted at a time point that a size of the original document D is determined by the sheet feed complete sensor 16 and a scanning start position is decided.

Generally, the size of an original document being used in an office is A4 size, and therefore, it may be arranged to start a forward movement of the slider 22 at a time point when an original document D is set on the original document feed table 10 to move the slider 22 to a scan starting position which is set for the A4 size original document. Even in this case, for an original document which is other than A4 size, it may also be arranged to adjust a timing to start a further forward movement of the slider 22 or a timing to start an image reading operation at a time point that a size of an original document D is determined by the sheet feed complete sensor 16 and a scanning start position is decided.

Now, description will be made on a copying machine to which a second embodiment of the present invention is applied.

Like parts are shown by corresponding reference numerals, and repeated descriptions will be omitted.

The copying machine 102 in the present embodiment is provided with an original document feed apparatus 1 on the upper portion of the machine. In the original document feed apparatus 1, there is provided an original document inverting device 118 which is different from the first embodiment of the present invention. The original document inverting device 118 receives an original document which has been temporarily set on a platen glass 21 for a copying operation, and returns the original document onto the platen glass 21 after inverting the document. By making use of the original inverting device 118, a double-faced original document can be automatically handled to copy both faces successively.

A scanner provided in the copying machine 102 is arranged to guide a light from an original document which has been scanned by a slider 22 onto a photoconductive drum 101 through mirrors 23a–23c, a zoom lens 124 and a mirror 23d which is a point different from the first embodiment of the present invention.

The photoconductive drum 101 constitutes a printer section 111 with apparatuses disposed thereabout. The printer section 111 receives an image exposure by said scanned light led onto the photoconductive drum 101 to form an electrostatic latent image corresponding to an original document. The printer section 111 also serves to visualize the electrostatic latent image formed on the photoconductive drum 101 through a process of toner development, and the visualized toner image on the photoconductive drum 101 is transferred on a recording sheet 123 forwarded from a sheet cassette 121 or 122.

The recording sheet 123 after the transfer process is fixed at a fixing section to complete a copying operation. The sheet is then discharged either to a discharge tray 116 when non-sorting is required or to each one of sorting bins 117 when sorting is required.

The copying machine 102 in the present embodiment is provided with an APS mode and an AMS mode corresponding to a relation between the size of an original document and the size of a recording sheet 123.

When the APS mode is selected, the copying machine 102 detects the size of an original document, and feeds a sheet by selecting either one of sheet feed cassettes 21 or 22 which matches to the size of the original document. On the other hand, when the AMS mode is selected, the copying machine 102 detects the size of an original document, and compares the size of the original document which has been detected and the size of a sheet loaded on the selected sheet feed cassette to perform a copying operation by adjusting magnification of the zoom lens to coincide with the size of the original document.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A scanning device which is capable of performing a scanning operation by a first mode for scanning an original document directly placed on an original document table and a second mode for scanning an original document placed on the original document table wherein an original document is fed and placed on a predetermined position of the original document table by an original document feeder, comprising:

a scanner which is capable of moving in reciprocating motion, wherein the scanner is moved forward to a farthest end portion of the original document from a standard position of the scanner passing through the original document placed on the original document table, and scans the original document in a reverse movement toward the standard position to read the original document;

a mode changer for changing over between said first mode and said second mode; and a controller for controlling the scanner to start a forward movement before an original document is placed on a predetermined position of the original document table when said second mode is selected.

2. A scanning device as claimed in claim 1, wherein the controller starts a forward movement of the scanner simultaneously with the start of a feeding operation of the original document feeder.

3. A scanning device as claimed in claim 2, wherein a velocity of the original document feeder for feeding an original document is equal to a velocity of forward movement of the scanner.

4. A scanning device as claimed in claim 3, wherein the scanning device is provided with a feeding complete sensor for detecting completion of said feeding operation of the original document feeder, and said controller controls the scanner to stop a forward movement based on a result of detection conducted by the feeding complete sensor, and controls to start a reverse movement.

5. A scanning device comprising:

an original document feeder for feeding an original document to a predetermined position on an original document table;

a scanner which is capable of moving in reciprocating motion, wherein the scanner is moved forward to a farthest end portion of the original document from a standard position of the scanner passing through the original document placed on the original document table, and scans the original document in a reverse movement toward the standard position to read the original document; and a controller for starting a forward movement of the scanner before the original document is placed on the predetermined position of the original document table.

6. A scanning device as claimed in claim 5, wherein the scanner is provided with a scanning optical system for guiding a reflected light which has scanned an image of the original document to a photoelectric conversion element during the reverse movement of the scanner.

7. A scanning device as claimed in claim 5, wherein the scanner is provided with a scanning optical system for leading a reflected light which has scanned an image of the original document to a photoconductor, and a printer for developing an electrostatic latent image formed on the photoconductor and transferring and fixing said image on a recording sheet during the reverse movement of the scanner.

8. A scanning device as claimed in claim 5, wherein the controller starts the forward movement of the scanner simultaneously with the start of feeding operation of the original document feeder.

9. A scanning device as claimed in claim 8, wherein a velocity of the original document feeder for feeding an original document is equal to a velocity of forward movement of the scanner.

10. A scanning device as claimed in claim 9, wherein the scanning device is provided with a feeding complete sensor for detecting completion of said feeding operation of the original document feeder, and said controller controls the scanner to stop a forward movement based on a result of detection conducted by the feeding complete sensor, and controls to start a reverse movement.

11. A copying machine which is provided with a first mode for copying an original document directly placed on an original document table, and a second mode for copying an original document placed on the original document table wherein an original document is fed and placed on a predetermined position of the original document table by an original document feeder, comprising:

a scanner which is capable of moving in reciprocating motion, wherein the scanner is moved forward to a farthest end portion of the original document from a standard position of the scanner passing through the original document placed on the original document table, and scans the original document in a reverse movement toward the standard position to read the original document;

a mode changer for changing over between said first mode and said second mode; and a controller for controlling the scanner to start a forward movement before an original document is placed on a predetermined position of the original document table when said second mode is selected.

12. A copying machine as claimed in claim 11, wherein the copying machine is provided with a plurality of sheet feeding units, said original document feeder is provided with a size sensor for detecting a size of the original document, and said controller selects a sheet feeding unit which contains a most suitable size of sheet corresponding to a size of an original document detected by the size sensor when the second mode is selected.

13. A copying machine as claimed in claim 11, wherein the copying machine is provided with a magnification adjuster for forming an image on a sheet either by enlarging or contracting the image of an original document, said magnification adjuster being arranged for calculating a most suitable magnification from the detected size of the original document and a size of a sheet fed from the sheet feeding unit.

14. A scanning device comprising:

an original document feeder for feeding an original document placed on a sheet feed tray to a predetermined position on an original document table;

a scanner which is capable of moving in reciprocating motion under and in parallel with the original document table wherein the scanner is moved forward at least to a farthest end portion of an original document from a retracted position where the scanner is positioned when not operated, and scans the original document in a reverse movement toward the retracted position; and a controller for starting a forward movement of the scanner to a predetermined position when a first size original document is placed on the sheet feed tray to be ready for a sheet feeding operation, wherein the predetermined position is a suitable position for starting to scan the first size document.

15. A scanning device as claimed in claim 14, wherein the original document feeder is provided with a size sensor for detecting a size of the original document.

16. A scanning device as claimed in claim 15, wherein the controller controls the scanner to further move from said predetermined position to a suitable position for starting to scan an original document based on a result of detection conducted by the size sensor if the detected size is different from the first size.

17. A method of scanning an original document by a scanning device which is provided with an original document feeder for feeding and placing an original document onto a predetermined position on an original document table, and a scanner which is movable in a reciprocating motion, wherein the scanner is moved forward at least to a farthest end portion of the original document from a standard position of the scanner passing through the original document, and scans the original document in a reverse movement toward the standard position to read the original document, comprising the following steps of:

a first step for starting an original document feeding of the original document feeder;

a second step for starting a forward movement of the scanner before completion of said original document feeding; and a third step for stopping the scanner after the completion of said original document feeding, and starting a reverse movement of the scanner.

18. A method of scanning of an original document as claimed in claim 14, wherein the forward movement of the scanner in the second step is started simultaneously with the start of original document feeding of the original document feeder in the first step.

* * * * *